M. LACHMAN.
METAL WHEEL.
APPLICATION FILED NOV. 17, 1919.
1,346,829. Patented July 20, 1920.
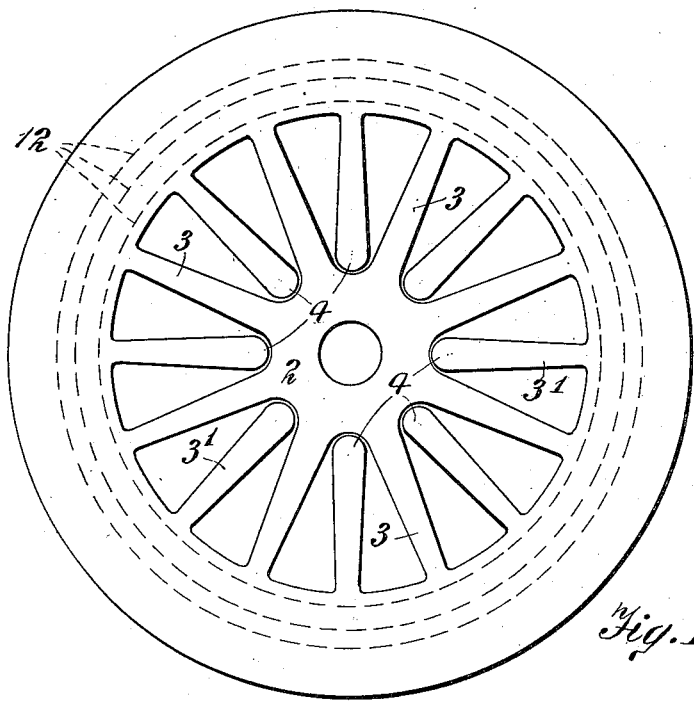
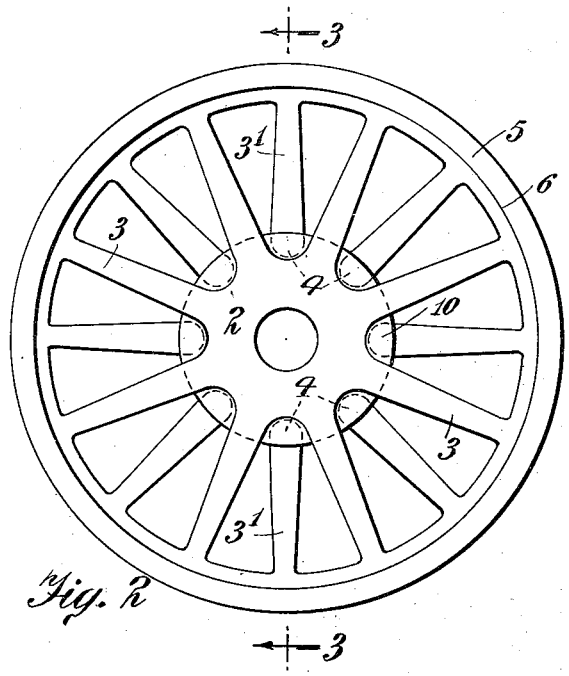
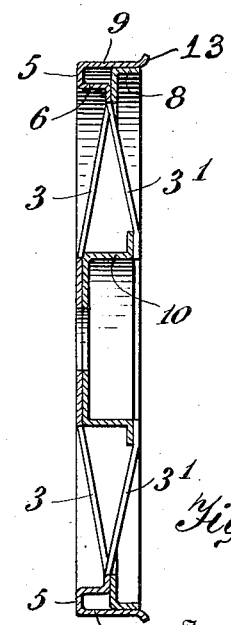
Inventor
MAURICE LACHMAN
By his Attorneys
Townsend & Decker

UNITED STATES PATENT OFFICE.

MAURICE LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METAL WHEEL.

1,346,829.   Specification of Letters Patent.   Patented July 20, 1920.

Application filed November 17, 1919. Serial No. 338,422.

*To all whom it may concern:*

Be it known that I, MAURICE LACHMAN, a citizen of the United States, and a resident of New York, in the county of New York and State of New York, have invented certain new and useful Improvements in Metal Wheels, of which the following is a specification.

My invention relates to wheels made from a sheet metal blank cut from a plate of sheet metal and adapted to constitute the rim, spoke and hub parts of the complete wheel, all of said parts being integral.

The object of my invention is to provide a sheet metal wheel having a hollow rim and which shall be capable of being cheaply manufactured and of a strong and rigid construction adapted to stand strains to which vehicle wheels are ordinarily subjected.

My invention consists of a sheet metal wheel having a hollow rim formed from the edge of a sheet metal blank and having spokes and hub part also formed from said blank, the spokes being staggered and all integral with one another.

The invention further consists in details of construction whereby I secure the desired strength or rigidity of hollow rim and of hub part of the completed wheel, all as more particularly hereinafter described and specified in the claims.

In the accompanying drawings:

Figure 1 is a plan of a sheet metal blank adapted to form the essential parts of the sheet metal portions of the wheel.

Fig. 2 is a side elevation of the wheel formed from said blank and

Fig. 3 is a vertical cross-section on the line 3—3 Fig. 2.

1 indicates the rim part, 2 the hub part of the sheet metal blank and 3, 3' the spoke parts thereof. The spoke parts 3 form continuations of the rim and center or hub part 2 while the spokes 3' at their inner ends are divided or separated from the inner portion of the blank at 4 to permit them to be staggered with relation to the spokes 3, so that at the hub ends they may be secured to the opposite end of the hub from that with which the center 2 of the blank is connected as illustrated in Fig. 3 of the drawing.

The rim part or edge of the blank 1 is struck up or formed into the hollow rim part 5, as shown, and so as to provide an offset or overhang as indicated at 6 from the general plane of the wheel or part of the rim from which the spokes 3, 3 spring and from which they diverge to opposite ends of the hub to give strength against torsional strains. Circular dotted lines 12 in Fig. 1 indicate the lines in which the metal blank is bent or deformed to make the rim. An annular angle piece indicated at 8 is applied beneath the extreme outer portion 9 of the rim, one angle thereof underlying the rim 9 while the other angle is applied to the side of the sheet metal blank and is properly secured thereto by welding or other means, thereby closing in the open side of the rim 5 to complete the hollow structure of rim. The lateral extension of rim 9, which the angle piece 8 underlies, also provides an overhang or offset for the side of the wheel opposite that on which the offset 6 is located. The horizontal portion of the annular angle piece may be also secured to the outer rim part 9 for strength and security.

10 indicates an annular flanged hub member against one flange of which the portion 2 of the sheet metal blank rests and to which it may be secured. Another outwardly projecting angle of said hub member forms a bearing for the free ends of the spokes 3', the latter being secured to said angle by welding or any other suitable means. A hub barrel inserted in the opening in the part 2 of the blank may be employed in the usual manner followed in the construction of metal wheels, flanges of said hub barrel being applied against the hub portion of the structure shown to hold the parts firmly together.

The extreme outer portion 9 of the rim may have a lip at its extreme edge indicated at 13 to form a bearing for a detachable rim, the fastening bolts of which may be mounted in the part 5.

What I claim as my invention is:—

1. A sheet metal wheel having a hollow rim, spoke parts and hub part all formed out of a sheet metal blank and integral with one another, combined with an annular angle piece one angle of which underlies the outer circumference of the rim while the other angle seats against the blank and completes the wall of the hollow rim portion of the wheel.

2. In a sheet metal wheel, the combination with spokes bent outwardly in opposite directions from a plate of sheet metal the edge of which forms the rim part of the wheel combined with an annular hub member interposed between the inner ends of the spokes and having inwardly and outwardly projecting flanges, the outwardly projecting flange engaging the free ends of the diverging spokes cut from the blank while the other flange forms a bearing for the undivided central portion of the blank in which the opposite set of spokes merges.

3. In a sheet metal wheel, the combination with a rim, spokes and center all integral with one another and formed from a sheet metal blank, of an annular angle member at the rim underlying by one angle the outer edge of said rim and closing by its other angle a groove to complete the hollow rim and an annular hub member having two flanges at its opposite ends respectively against which the diverging ends of two sets of spokes cut from said blank respectively engage.

Signed at New York, in the county of New York and State of New York, this 12th day of November, A. D. 1919.

MAURICE LACHMAN.

Witnesses:
F. B. TOWNSEND,
IRENE LEFKOWITZ.